H. N. PACKARD.
FLUID METER.
APPLICATION FILED SEPT. 11, 1917.

1,325,040.  Patented Dec. 16, 1919.

Witness
Robert H. Weir

Inventor:
Horace N. Packard
by Edwin B. H. Tower Jr.
Atty.

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,325,040.  Specification of Letters Patent.  Patented Dec. 16, 1919.

Application filed September 11, 1917. Serial No. 190,724.

*To all whom it may concern:*

Be it known that I, HORACE N. PACKARD, a citizen of the United States, residing at Milwaukee, in the county of Milwaukee and State of Wisconsin, have invented new and useful Improvements in Fluid-Meters, of which the following is a specification.

This invention relates to fluid meters.

Meters have been developed for measuring the rate of flow of fluids by causing a heat transfer between a body and the fluid and utilizing the effect of the heat transfer in determining the rate of flow of the fluid.

These meters usually comprise an electrical heater for imparting heat to the fluid and a thermometer resistance located at each side of the heater. The thermometer resistances act through automatic mechanism to control the supply of electrical energy to the heater to maintain a constant temperature rise in the fluid between the points where the thermometer resistances are located. If this be done the electrical energy consumed by the heater in maintaining this constant temperature rise will be a measure of the rate of flow of the fluid.

This invention relates particularly to the housing and to the structural features of a meter of the above and similar types.

One form of housing for meters of this type is shown in the patent to C. C. Thomas, No. 1,218,717, of March 13, 1917. The housing shown in this patent has certain advantages and certain disadvantages which will be hereinafter pointed out. This invention aims to preserve the advantages of the type of housing shown in the aforesaid patent and to overcome the disadvantages thereof.

The housing shown in the above mentioned Thomas patent is provided with a web or partition which divides the interior of the housing into two compartments. The partition supports a cylindrical barrel in which are located the heater and thermometer resistances. The fluid to be measured flows upward through the barrel. The portion of the barrel below the partition is jacketed by the incoming fluid and the portion of the barrel above the partition is jacketed by the outgoing fluid.

The main advantage of the type of housing shown in the Thomas patent is that the jacketing of the barrel by the incoming and outgoing fluid prevents any transfer of heat to or from the fluid being measured while it is passing from one thermometer resistance to the other. The accuracy of the meter is therefore preserved as no temperature change takes place in the fluid between the thermometer resistances other than that produced by the heater.

The disadvantages of a housing of the type shown in the aforesaid Thomas patent are as follows:—The lower part of the housing just below the barrel forms a collecting place for water in the line and requires a special drain which is not always reliable. It would be possible for sufficient water to collect at this point to seal off the line or at least to seriously interfere with the meter operation. Furthermore, as the barrel containing the heater and thermometer resistances is short compared with its diameter, non-uniform velocity stream lines occur at the entrance and exit ends of the barrel. If these non-uniform velocity stream lines are allowed to become extreme, they are detrimental to the accuracy of results. Moreover, the housing does not permit the measuring units to be readily removed, chiefly on account of the partition which divides the housing into two compartments. Finally, the partition which supports the barrel serves to conduct an appreciable quantity of heat outwardly to the walls of the housing where it is lost to the atmosphere. This, of course, produces inaccuracies in the reading of the meter.

One object of this invention is to provide a meter having improved means for causing the fluid being measured to be jacketed by some of the fluid itself.

Another object is to provide a meter housing which will not collect moisture where it will endanger the operation of the meter.

Another object is to provide a meter having a housing for causing the measuring units to be jacketed by the fluid and in which the units are readily removable from the housing.

Another object is to provide a meter having a housing inclosing the measuring units and in which the heat conduction from the units to the housing is reduced to a minimum.

Another object is to provide a meter in which the velocity stream lines in the fluid near the measuring units are uniform.

Other objects will appear as the specification proceeds.

An embodiment of the invention is illustrated in the accompanying drawing. The views of the drawing are as follows.

Figure 1:
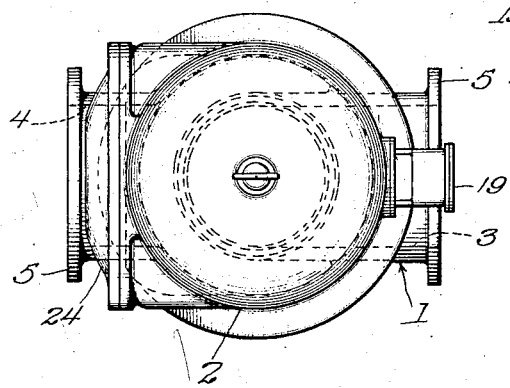
Figure 1 is a plan view of the improved meter.
Figure 2:
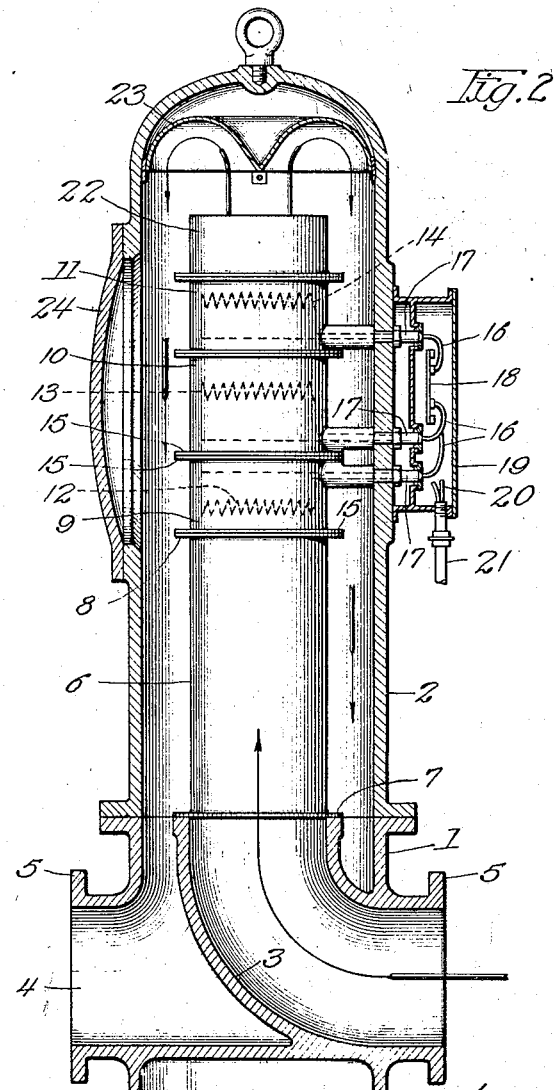
Fig. 2 is a vertical section thereof.

The meter illustrated in the drawing will be specifically described, but the specific description is for exemplary purposes and for the purpose of making the construction of one embodiment of the invention clear, and should not be construed in a limiting sense.

The housing of the meter comprises two main portions, a lower portion 1 which contains the entrance and exit openings, and the upper portion 2 which contains the measuring units.

The lower portion 1 of the housing is provided with an entrance conduit 3 and an exit conduit 4. The entrance and exit conduits are provided with flanges 5, by means of which the housing may be connected to a gas main through which the fluid to be measured flows.

The upper end of the conduit 3 supports an elongated sleeve 6, and the measuring units are supported by this sleeve. The lower end of the sleeve 6 is flanged, as shown at 7, so that it may be supported by the upper edge of the entrance conduit 3. The upper end of the sleeve 6 is also flanged, as shown at 8, in order to support the measuring units. The three measuring units are shown at 9, 10, and 11. The first unit 9 contains a thermometer resistance 12; the second measuring unit 10 contains a heater resistance 13; and the third measuring unit 11 contains a thermometer resistance 14. The frames of the measuring units are cylindrical in shape and are provided with flanges 15 whereby they may be supported by one another and by the flange 8 on the sleeve 6.

The leads 16 from the heater and thermometer resistances pass outwardly through the terminals 17 and are connected to a terminal board 18, supported on the outside of the housing. The terminal board 18 and the terminals 17 are inclosed by a casing 19. The external conductors 20 are led to the casing 19 through a conduit 21, and these conductors are properly connected to the terminal board 18.

The upper measuring unit 11 supports a cylindrical section 22 which causes the fluid to continue to flow upward for a short distance after it leaves the exit thermometer unit 11.

A deflector or shield 23 is located in the upper portion of the housing just above the exit opening in the last section 22. This deflector is made of thin sheet metal and prevents the fluid from coming in contact with the upper end of the housing for the purpose hereinafter described.

The upper portion 2 of the housing is provided with a removable cover 24. By removing the cover 24, the measuring units may be readily removed from the housing.

The fluid to be measured enters the housing through the entrance conduit 3 in the direction of the arrows. It flows upward through the sleeve 6, then through the measuring units, and is then deflected downward by the deflector 23. It then passes downward around the outside of the measuring units and the sleeve 6 and leaves the housing through the exit conduit 4.

The heater and thermometer resistances may be used to measure the rate of flow in any one of a number of different ways, but as the manner in which the flow is measured has nothing to do with the present invention, the electrical devices which are ordinarily connected with the heater and thermometer resistances are not shown and will not be described. It should be understood, however, that any heat transferred to or from the fluid being measured while it is passing from the entrance thermometer resistance to the exit thermometer resistance other than that supplied by the heater will affect the accuracy of the meter. As the measuring passage between the two thermometer resistances is jacketed by the outgoing fluid, it is obvious that there will be practically no loss of heat from the fluid being measured to the atmosphere. The fluid passing downward around the outside of the measuring units having been heated by the heater 3 is hotter than the incoming fluid and therefore practically no condensation of moisture takes place in the incoming fluid.

The deflector 23 is made of light sheet metal in order to prevent an excessive amount of heat being transferred between the fluid and the atmosphere in case of a large temperature gradient between the fluid inside of the housing and the atmosphere around the housing. If the fluid came in direct contact with the relatively large mass of metal at the top of the housing a rapid transfer of heat through the housing would take place. The thin metal of the deflector 23, however, does not so readily conduct the heat and therefore the heat transfer is not so great as would be the case if the deflector 23 were not provided.

The sleeve 6 is also made of thin sheet metal so as to reduce the loss of heat by conduction from the measuring units to the housing. The thin walls of the sleeve 6 offer relatively high resistance to the conduction of heat and therefore the heat losses by conduction from the measuring units to the housing are reduced to a minimum.

The sleeve 6 is made relatively long so as to produce a straight passage of considerable length before the fluid reaches the measuring units. This straight approach prevents excessive, non-uniform velocity stream lines in the fluid approaching the measuring units.

It will be noted that due to the manner in which the lower portion of the housing is formed there is no place where moisture can collect and endanger the operation of the meter.

The terminal structure herein illustrated has been found very efficient in meters having housings of other types and the housing herein disclosed permits the use of this terminal structure.

In fluid meters of the present type, the fluid while it is being measured is usually made to flow in a vertical direction. This, in numerous cases, has necessitated the use of a vertical section of piping through which the fluid being measured flows and a return conduit commonly called a "return riser" for returning the fluid to the gas main. The present construction combines these two conduits in one compact piece of apparatus and eliminates the necessity of using two separate conduits for causing the fluid to flow upward and then downward back to the gas main. One of the conduits is practically eliminated in the present construction, as the measuring units themselves form one conduit and the housing forms the return conduit. The meter is therefore not only made more compact, but it is less expensive to manufacture and to install.

One form of the invention has been specifically described for illustrative purposes only, and it will be understood that other forms may be devised which are within the scope of the accompanying claims.

What I claim is:—

1. A fluid meter comprising a housing, an inner conduit through which the incoming fluid flows in one direction, thermal flow measuring elements in said conduit, and means to constrain the outgoing fluid to flow in the opposite direction through the space around said conduit and thus to jacket the entire length of said conduit.

2. A fluid meter comprising a housing, an inner conduit through which the incoming fluid flows in an upward direction, thermal flow measuring elements in said conduit, and means to direct the outgoing fluid downwardly around the entire length of said conduit.

3. A fluid meter comprising a housing, an inner conduit through which the incoming fluid flows in one direction, thermal flow measuring means comprising a pair of temperature responsive elements in said conduit, and means to constrain the outgoing fluid to flow in the opposite direction around said conduit from one temperature responsive element to the other.

4. A fluid meter comprising a housing, an inner conduit through which the incoming fluid flows in one direction, thermal flow measuring means comprising a pair of thermometer resistances located in said conduit, and means to constrain the outgoing fluid to flow in the opposite direction around all of that portion of the conduit between the thermometer resistances.

5. A fluid meter comprising a housing, an inner conduit through which the incoming fluid flows in one direction, heater and thermometer resistances located in said conduit, and means to constrain the outgoing fluid to flow in the opposite direction through the housing and around the entire length of the conduit.

6. A meter comprising a housing, an inner conduit through which the incoming fluid flows in an upward direction, heater and thermometer resistances located in said conduit, and means to direct the outgoing fluid downwardly in said housing around the entire length of said conduit.

7. A fluid meter comprising a housing, an inner conduit through which the incoming fluid flows in one direction, thermal flow measuring elements in said conduit, and means to constrain the outgoing fluid to flow in the opposite direction around the entire length of said conduit and around the thermal flow measuring elements.

8. A fluid meter comprising a housing, an inner conduit through which the incoming fluid flows, flow measuring means comprising a heater located in said conduit, and means to constrain the outgoing heated fluid to jacket the entire length of said conduit.

9. A fluid meter comprising a conduit through which the incoming fluid flows in one direction, thermal flow measuring elements in said conduit, and means to constrain the outgoing fluid to flow in the opposite direction around the conduit and throughout the entire length of the same.

10. A fluid meter comprising a housing, an inner conduit projecting upwardly into said housing, thermal flow measuring elements in said conduit, and an inlet and an outlet associated with said housing whereby the incoming fluid passes upwardly through the conduit and then flows downwardly through the housing around the entire length of the conduit to the outlet.

11. A fluid meter comprising a housing, a conduit projecting upwardly into the housing and through which the incoming fluid flows in an upward direction, thermal flow measuring elements located in the upper portion of said conduit, and means to constrain the outgoing fluid to flow downwardly around the entire length of said conduit.

12. A fluid meter comprising a housing having an inlet, a plurality of thermal measuring units located in said housing and forming an inner conduit, and a relatively long sleeve having an interior passage connecting said inlet with the conduit formed by said measuring units.

13. A fluid meter comprising a housing having an inlet, a plurality of thermal measuring elements located in said housing, and a relatively long conduit communicating with said inlet and directing the incoming fluid by said flow measuring elements, said conduit having a lower heat conductivity than the housing.

14. A fluid meter comprising a housing having an inlet nozzle projecting into the housing, a conduit section adjoining said inlet nozzle, thermal flow measuring elements supported by said conduit section, the walls of the conduit section being thin as compared to the walls of said inlet nozzle.

15. A fluid meter comprising a housing having an inlet conduit projecting into the same, a sleeve supported by said conduit and forming an extension thereof, said sleeve having a lower heat conductivity than the walls of said housing, and a plurality of thermal measuring units forming a further extension of said conduit.

16. A fluid meter comprising a housing having an inlet conduit projecting into the same and through which the incoming fluid flows in an upward direction, a sleeve supported by said conduit and forming an extension thereof, said sleeve having a lower heat conductivity than the walls of said housing, a plurality of thermal measuring units forming a further extension of said conduit, and means to constrain the outgoing fluid to flow downwardly through the housing around said conduit.

17. A fluid meter comprising a housing, an inner conduit through which the incoming fluid flows and from which it is discharged into the housing, flow measuring means comprising a heater in said conduit, and means to prevent contact of the fluid with the housing when it is discharged from said conduit.

18. A fluid meter comprising a housing, an inner conduit through which the incoming fluid flows and from which it is discharged into the housing, flow measuring means comprising a heater in said conduit, and means to prevent contact of the fluid with the housing when it is discharged from said conduit, said means comprising a shield having a lower heat conductivity than the walls of the housing.

19. A fluid meter comprising a housing, an inner conduit through which the incoming fluid flows and from which it is discharged into the housing, flow measuring means comprising a heater located in said conduit and a sheet metal shield for preventing contact of the fluid with the housing when the fluid is discharged from said conduit.

20. A fluid meter comprising a housing, an inner conduit through which the incoming fluid flows in an upward direction, means to constrain the outgoing fluid to flow downwardly through the housing and around the entire length of the conduit, thermal flow measuring units supported in said conduit, and means whereby said units may be removed from the housing.

21. A fluid meter comprising a housing, a conduit projecting upwardly into said housing and through which the incoming fluid flows in an upward direction, thermal flow measuring units associated with the upper portion of said conduit, means to constrain the outgoing fluid to flow downwardly through the housing around all of said measuring units, and a removable closure associated with the housing adjacent to the measuring units whereby the measuring units may be removed from the housing.

22. A fluid meter comprising a vertically disposed housing, a vertical conduit located in said housing, the housing having at its lower portion an entrance opening for the incoming fluid communicating with said conduit and an exit opening for the outgoing fluid communicating with the space around said conduit, and the conduit having at its upper portion an opening communicating with the interior of the housing whereby the fluid will flow upwardly through said conduit and then downwardly around the entire length of conduit to the exit opening at the lower part of the housing, and thermal flow measuring means located in said conduit.

23. A fluid meter comprising a housing having an inlet nozzle, a relatively long sleeve supported on said nozzle and having a lower heat conductivity than the housing, and a plurality of thermal measuring units having cylindrical frames supported directly by said sleeve.

24. A fluid meter comprising a housing, a relatively long sleeve supported in the housing and through which the incoming fluid flows, said sleeve having a lower heat conductivity than the housing, and at least one thermal measuring unit having a cylindrical frame forming a continuation of said sleeve.

25. A fluid meter comprising a housing, a relatively long sleeve supported in the housing and through which the incoming fluid flows, said sleeve having a lower heat conductivity than the housing, and at least one thermal measuring unit having a cylindrical frame supported by and forming a continuation of said sleeve.

26. A fluid meter comprising a housing, a sleeve supported in the housing and through which the incoming fluid flows, said sleeve having a lower heat conductivity than the housing, and at least one thermal measuring unit having a frame forming a continuation of the sleeve, the fluid being discharged from the inner passage formed by the sleeve and said frame into the housing.

27. A fluid meter comprising a housing closed at one end, an inner conduit projecting into the housing and through which the incoming fluid flows, said conduit terminating short of the closed end of the housing, whereby the fluid will be discharged from the conduit into the housing, and means to discharge the outgoing fluid from the housing, said conduit being made up of a sleeve supported in the housing, and at least one thermal measuring unit having a frame forming a continuation of said sleeve.

28. A fluid meter comprising a housing closed at one end, an inner conduit projecting into the housing and through which the incoming fluid flows, said conduit terminating short of the closed end of the housing, whereby the fluid will be discharged from the conduit into the housing, and means to discharge the outgoing fluid from the housing, said conduit being made up of a sleeve supported in the housing and at least one thermal measuring unit having a frame supported directly by said sleeve and forming a continuation thereof.

In witness whereof I have hereunto subscribed my name.

HORACE N. PACKARD.